March 24, 1931.     M. F. SCHULZ     1,798,036
GARDEN TOOL
Filed Oct. 4, 1929
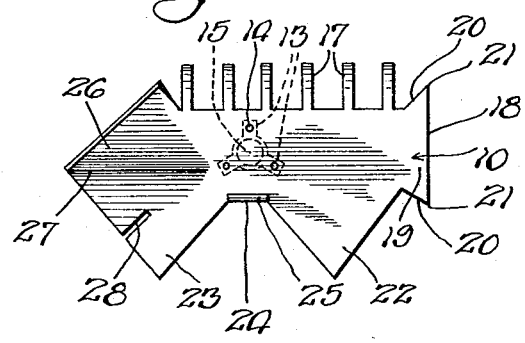
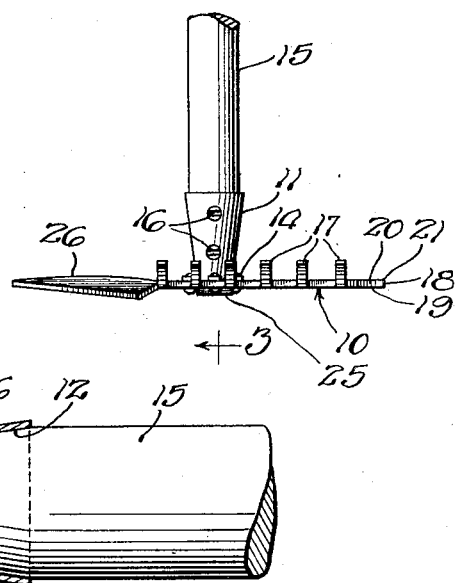
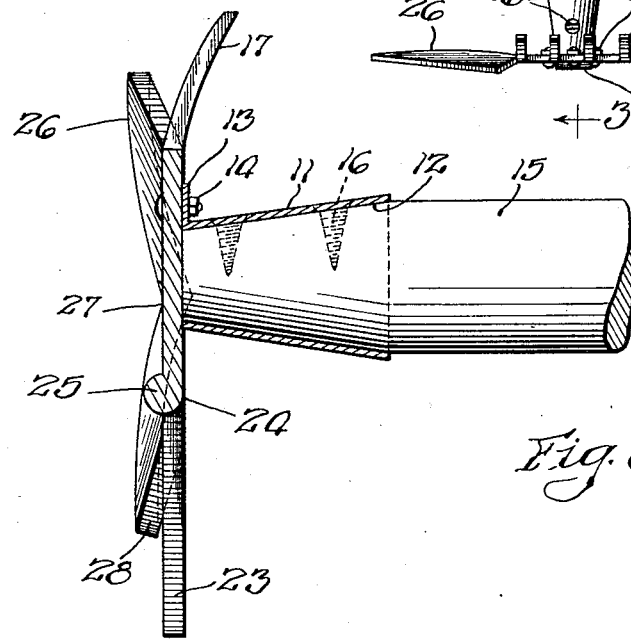
Max F. Schulz INVENTOR
BY Victor J. Evans
HIS ATTORNEY.

Patented Mar. 24, 1931

1,798,036

UNITED STATES PATENT OFFICE

MAX F. SCHULZ, OF CHICAGO, ILLINOIS

GARDEN TOOL

Application filed October 4, 1929. Serial No. 397,291.

This invention relates to certain novel improvements in garden tools and has for its principal object the provision of an improved construction of this character which will be highly efficient in use and economical in manufacture.

It is among the objects of my invention to provide a single tool which may be employed to perform the various functions required of various tools employed in gardening.

Another object of the invention is to provide a tool of the above described character which will embody a very expeditious arrangement for weeding young plants.
Another object of the invention is to provide a tool of the above described character which will be arranged to include a very expeditious furrowing arrangement which will facilitate the planting of seeds.
A further object of the invention is to provide a rake arrangement which will embody teeth that will not readily become clogged and to also provide a portion on the device which may be used as a hoe.
Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a front elevational view of a device constructed in accordance with my invention;

Fig. 2 is a top plan view; and

Fig. 3 is a sectional view taken substantially on the line 3—3 on Fig. 2.

In the accompanying drawing wherein I have illustrated a preferred form of construction for my invention 10 generically indicates the main body of my device which has a member 11 providing a socket 12 extended from the rear face thereof which member 11 includes foot portions 13 through which securing elements such as the rivets 14 are extended so as to secure the member 11 in position. A suitable handle 15 is provided which is extended into the socket 12 and which is retained therein in the present instance by the screw 16.

Along what is the upper edge of the body 10 as depicted in Fig. 1 a plurality of outwardly projecting fingers 17 are provided which are spaced apart in predetermined amounts and which embody a rearwardly extending curve as shown in Fig. 3. These fingers 17 are spaced apart and serve as a rake when the device is moved over the ground in the manner well understood in the art clogging thereof is substantially eliminated. and by reason of the fact that they are substantially rectangular in cross section and are spaced apart in relatively great amounts

At one end of the body 10 a relatively straight edge 18 is provided on the end of a portion 19 which embodies tapered edges 20 that provide sharp corners 21. This arrangement provides a hoe and it is manifest that by reason of the sharp corners 21 provided that the device may expeditiously be employed in restricted places.

Along the edge of the body 10 opposite that having the fingers 17 extending therefrom are two substantially triangular formations 22 and 23 which have a straight section 24 arranged therebetween. The edge of the relatively straight section 24 is turned upwardly as indicated at 25 and, therefore, a sharp edge at this point is eliminated. This arrangement is intended to be employed in weeding young plants and the top edges of the plants will be disposed below the rolled portion 25 and it is, therefore, manifest that the likelihood of damage thereto will be substantially eliminated.

At the end of the device opposite the edge 18 a substantially triangular formation 26 is provided which is bent rearwardly along the line 27 extended from the apex thereof, a slot 28 being provided intermediate the triangular portions 23 and 26 to facilitate this bending and by reason of this bending a substantially plow like member is provided which may be employed for plowing.

It is manifest from the foregoing description that I have provided a very expeditious garden tool which may be employed to perform the functions of various garden tools and it is, therefore, manifest that this tool embodies a very expeditious arrangement for weeding young plants.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A garden tool comprising a main body, means providing a handle receiving socket secured to one side of said body, a substantially triangular portion extending from one end of said body having a bend extending therealong from the apex thereof toward said body, and a substantially straight edge on a projecting portion at the opposite end of said body, said projecting portion having inwardly tapered edges defining relatively sharp corners at the juncture thereof with said straight edge.

2. A garden tool comprising a main body, means providing a handle receiving socket secured to one side of said body, spaced apart triangular formations projecting from said body along one edge thereof, said body having a relatively straight portion intermediate said triangular portions and having the portion thereof adjacent said straight portion bent upwardly to provide a rolled edge.

In testimony whereof I affix my signature.

MAX F. SCHULZ.